US010563780B2

(12) United States Patent
Leroyer et al.

(10) Patent No.: US 10,563,780 B2
(45) Date of Patent: Feb. 18, 2020

(54) COMPACT MULTI-WAY VALVE FOR CONNECTING TWO FLUID-CIRCULATION CIRCUITS

(71) Applicant: ZODIAC POOL CARE EUROPE, Paris (FR)

(72) Inventors: Brice Leroyer, Toulouse (FR); Philippe Pichon, Villeneuve de Riviere (FR)

(73) Assignee: ZODIAC POOL CARE EUROPE, Bron (FR)

( * ) Notice: Subject to any disclaimer, the term of this patent is extended or adjusted under 35 U.S.C. 154(b) by 0 days.

(21) Appl. No.: 16/067,525

(22) PCT Filed: Dec. 19, 2017

(86) PCT No.: PCT/FR2017/053692
§ 371 (c)(1),
(2) Date: Jun. 29, 2018

(87) PCT Pub. No.: WO2018/115713
PCT Pub. Date: Jun. 28, 2018

(65) Prior Publication Data
US 2019/0360601 A1 Nov. 28, 2019

(30) Foreign Application Priority Data

Dec. 20, 2016 (FR) .................................... 16 62923

(51) Int. Cl.
*F16K 11/074* (2006.01)
*F16K 11/076* (2006.01)
*E04H 4/12* (2006.01)

(52) U.S. Cl.
CPC .............. *F16K 11/074* (2013.01); *E04H 4/12* (2013.01); *F16K 11/076* (2013.01)

(58) Field of Classification Search
CPC ......... F16K 11/074; F16K 11/076; E04H 4/12
See application file for complete search history.

(56) References Cited

U.S. PATENT DOCUMENTS

| 4,313,428 A | 2/1982 | Goldenberg |
| 4,371,003 A | 2/1983 | Goguen |

(Continued)

FOREIGN PATENT DOCUMENTS

| DE | 2540435 | 3/1977 |
| FR | 1227909 | 8/1960 |
| FR | 2891590 | 4/2007 |

OTHER PUBLICATIONS

International Patent Application No. PCT/FR2017/053692, "International Search Report (Including English translation) and Written Opinion", dated Apr. 24, 2018.

*Primary Examiner* — Janie M Loeppke
(74) *Attorney, Agent, or Firm* — Kilpatrick Townsend & Stockton LLP; Dean W. Russell

(57) ABSTRACT

The invention relates to a connecting valve (10), comprising at least four connections (101-104) for fluid circulation tubes, which comprises a single control member (120) designed to allow the selective creation of several configurations of communication pathways within the valve, between certain tube connections; these configurations notably include: • a first configuration in which a first tube connection, referred to as "main inlet" (103) is placed in communication with only a second tube connection, referred to as "main outlet" (104), • a second configuration in which the main inlet is placed in communication with a third tube connection (101), referred to as "bypass outlet", and a fourth tube connection (102) referred to as "bypass return" is placed in communication with the main outlet, and • a third configuration in which the main inlet is placed in communication both with the main outlet and with the bypass outlet, and the bypass return is placed in communication with the main outlet.

10 Claims, 12 Drawing Sheets

(56) References Cited

U.S. PATENT DOCUMENTS 6,625,824 B1\* 9/2003 Lutz .......................... E04H 4/12
  137/625.21
2006/0231146 A1  10/2006 Lillback \* cited by examiner

COMPACT MULTI-WAY VALVE FOR CONNECTING TWO FLUID-CIRCULATION CIRCUITS

CROSS-REFERENCE TO RELATED APPLICATIONS

This application is a national phase entry under 35 USC § 371 of International Application PCT/FR2017/053692 ("the '692 application"), filed Dec. 19, 2017, and entitled COMPACT MULTI-WAY VALVE FOR CONNECTING TWO FLUID-CIRCULATION CIRCUITS, which claims priority to and benefits of French Patent Application No. 1662923 ("the '923 application"), filed on Dec. 20, 2016, and entitled COMPACT MULTI-WAY VALVE FOR CONNECTING TWO FLUID-CIRCULATION CIRCUITS. The '692 application and the '923 application are hereby incorporated in their entireties by this reference.

TECHNICAL FIELD OF THE INVENTION

The present invention relates to the field of equipment for swimming pools. The invention more particularly relates to a multi-way valve permitting the supply of water to swimming pool equipment which is mounted in a bypass configuration on the principal filtration circuit of a swimming pool.

PRIOR ART

A principal filtration circuit known from the prior art comprises, as a minimum, means for collecting the water of the swimming pool (drain plug or skimmer), at least one means for pumping the water of the pool, at least one means for filtering the swimming pool water and means for recirculating the water into the swimming pool (nozzles).

Rigid or flexible pipes made of plastics connect these different pieces of equipment in order to close the principal hydraulic circuit of the swimming pool. In order to facilitate the maintenance and increase the period of use of the swimming pool, equipment permitting the automatic treatment of the water and the heating of the water have been developed.

The majority of this equipment is mounted in a bypass on the principal filtration circuit. A bypass system comprising three separate valves is installed for each piece of equipment. A first valve is located on the principal circuit, flanked by an upstream tapping, defining the inlet of the bypass circuit, on which a second valve is installed and a downstream tapping, defining the end of the bypass circuit, on which a third valve is installed. The valve located on the principal circuit permits the flow to be adjusted in the equipment located in the bypass. The third valve located downstream of the equipment located in the bypass permits the pressure in the equipment to be adjusted and, with the valve located upstream of the equipment, permits this equipment to be isolated from the principal circuit.

Moreover, conventional valves do not have an opening indicator, such that when handled for wintering, for example, the user will have difficulty in finding the initial setting again. Moreover, this system is bulky, costly and requires a significant installation time. This aspect is all the more critical when this equipment is installed on a principal filtration circuit which is already present and where the required space for the installation of the bypass is not available. The patent U.S. Pat. No. 4,279,128 discloses such motorized equipment associated with a system for heating the swimming pool.

Moreover, multi-way valves exist. Such valves are used to permit the cleaning and to control the use of the filtration system. The patents EP 0909911 and EP 1783408 disclose such multi-way valves. These valves connect two circuits such that all of the fluid leaving the upstream supply circuit is located in the downstream circuit.

None of the current solutions, however, enable all of the required needs to be met, namely to propose a device which is compact and inexpensive and which is capable, in a single movement, of selectively conducting all or part of the flow leaving a principal circuit for supplying liquid to a secondary supply circuit, the remaining flow being conducted to the liquid outlet of the principal circuit.

SUBJECT OF THE INVENTION

The object of the present invention is to remedy at least partially the limitations of the prior art cited above.

Thus the invention relates to a multi-way valve permitting the supply of equipment mounted in a bypass on the principal filtration circuit of the swimming pool, such as heating equipment or equipment for treating the swimming pool water.

The invention proposes to replace the systems proposed by the prior art by a compact connecting valve implementing all of the functions of the three valves conventionally used. A valve according to the invention may further comprise an adjustment indicator, indicating the degree of opening of the bypass circuit, such that it will be very easy for the user to handle the valve and to return it to an initial setting. This valve further has the advantages of being very compact and inexpensive.

According to a first aspect, the invention relates to a connecting valve, which comprises at least four tube connections for the circulation of fluid and which comprises a single control member capable of permitting the selective creation of several configurations of communication channels within the valve between certain tube connections, including at least:

a first configuration in which a first tube connection, the so-called "principal inlet", is placed in communication solely with a second tube connection, the so-called "principal outlet", a second configuration in which the principal inlet is placed in communication with a third tube connection, the so-called "bypass outlet", and a fourth tube connection, the so-called "bypass return", is placed in communication with the principal outlet and a third configuration in which the principal inlet is placed in communication both with the principal outlet and with the bypass outlet and the bypass return is placed in communication with the principal outlet.

Due to these arrangements, the valve according to the invention permits a user, in a single movement, to distribute selectively a flow of liquid from a supply of a principal circuit to the supply of a bypass circuit, or to the outlet of the principal circuit or to divide the flow of liquid between the supply of the bypass circuit and the outlet of the principal circuit.

In one exemplary embodiment, the flow of liquid distributed by the supply of the principal circuit comes from the water pumped from a swimming pool by pumping and collecting means, such as drain plugs or skimmers, and the liquid conducted to the outlet of the principal circuit is discharged into the swimming pool by means for recirculating the water, nozzles for example. The principal circuit preferably comprises filtration equipment. Rigid or flexible pipes connect these different pieces of equipment in order to close the principal hydraulic circuit of the swimming pool.

Advantageously, the bypass circuit, also called the secondary circuit, supplies swimming pool equipment such as equipment for the automatic treatment of the water and/or equipment for heating the water, for example a heat pump. The valve according to the present invention which is located on the principal circuit permits the adjustment of the flow in the equipment located in the bypass.

In some embodiments, said connecting valve is also capable of permitting the creation of a fourth configuration in which each of the tube connections is isolated from the others.

Due to these arrangements, the flow of liquid from the first tube connection, the so-called "principal inlet", may be blocked. This configuration permits the flow of liquid to be stopped completely, both in the principal circuit and in the bypass circuit. This configuration is advantageous in order to stop the circulation of liquid both in the principal circuit and in the bypass circuit, for example when the operation of the swimming pool is stopped for full wintering—the filtration pump is no longer supplied—or during a maintenance operation on equipment of the principal circuit.

The first configuration corresponds to a partial wintering configuration—the pump is started up at least once per day in order to avoid the creation of an ice plug in the principal circuit and the bypass circuit is isolated and drained—or during a maintenance operation on the equipment mounted in the bypass.

In some embodiments, the third valve configuration enables the proportion of fluid from the principal inlet guided toward the bypass outlet to be continuously or sequentially varied, the remaining flow being guided toward the principal outlet.

In some embodiments, the valve according to the invention comprises a valve body perforated by four tube connections for the circulation of fluid and the control member is mounted so as to be mobile in rotation, the angular position of the control member controlling the proportion of fluid conducted from the principal inlet to the principal outlet and the proportion of fluid bypassed to the bypass outlet, the bypassed fluid being conducted to the bypass return which in turn overflows into a compartment arranged in the valve body where the bypassed fluid is mixed with the fluid conducted to the principal outlet.

In some embodiments, the fluid from the principal inlet overflows into the valve body, and the valve body is subdivided into a plurality of compartments, at least one being connected to the principal outlet and at least one being connected to the bypass outlet, the control member comprising an opening which guides the flow of fluid by placing the opening opposite at least one of the compartments.

In some embodiments, the compartment connected to the principal outlet and the compartment connected to the bypass outlet are mounted such that the opening of the control member may be positioned so as to overlap between said compartments to vary the flow guided toward the bypass outlet from 0% to 100%, the remaining flow being guided toward the principal outlet.

In some embodiments, the selection member comprises a sealing member which is configured, in cooperation with the valve body, to block the flow of fluid when it is positioned opposite the tube connection connected to the principal inlet.

This embodiment permits the implementation of the fourth configuration of the valve in which each of the tube connections is isolated from the others.

In some embodiments, the valve comprises a gripping handle which is fixed to the control member and facilitates its rotation by an operator.

In some embodiments, the valve comprises at least one visual indicator of the position of the control member.

Due to these arrangements, the invention enables a user to observe the position of the control member at a glance. Advantageously, the visual indicator indicates the distribution of the flow of liquid between the principal circuit and the bypass circuit.

In some embodiments, the valve comprises a motorized means providing the rotation of the control member.

Due to these arrangements, the handling of the valve according to the invention is facilitated. The rotation of the control member does not require any physical effort on the part of the user. The implementation of motorized means providing the rotation of the control member is also useful for the remote control or automatic control of the valve.

In some embodiments, the valve comprises at least one sensor measuring physical data representative of a state of the fluid and a central unit controlling the motorized means as a function of the physical data measured by the sensor.

In the exemplary embodiment of the valve according to the invention for a swimming pool, the physical data representative of a state of the fluid are recorded by one or more sensors which are able to be arranged in the hydraulic circuit associated with the pool or in the pool itself.

Several examples of physical data representative of a state of the fluid include the flow rate in the principal circuit, the temperature, the pH (potential of Hydrogen), the concentration of a contaminating product or of a maintenance product for a swimming pool, the turbidity or even the colorimetry.

These arrangements permit an automatic control of the valve as a function of the state of the fluid according to specific instructions. These instructions may be control loops which are well known. In one embodiment, when a temperature which is lower than a threshold value is measured, a greater flow of liquid is conducted toward a heat pump mounted on the bypass circuit.

In some embodiments, the valve comprises means for detecting the position of the control member and means for transmitting the position of the control member to a remote server.

In some embodiments, the valve is capable of being controlled remotely by an operator by means of an intelligent portable terminal.

According to a second aspect, the invention relates to a swimming pool comprising a pool, means for collecting the water and means for recirculating the water into the pool, a principal hydraulic circuit circulating the water through a filtration unit by means of a pump, said swimming pool further comprising a secondary hydraulic circuit for the supply of swimming pool equipment mounted in a bypass on the principal circuit by means of a connecting valve according to the invention.

Since the advantages, object and features of a swimming pool equipped with a valve according to the invention are similar to those of the valve according to the invention, they are not repeated here.

DESCRIPTION OF THE FIGURES

Further particular advantages, objects and features of the present invention will be revealed from the following non-limiting description of at least one particular embodiment of the devices, methods and systems according to the present invention, with reference to the accompanying drawings, in which.

DETAILED DESCRIPTION OF AN EMBODIMENT OF THE INVENTION

The present description is provided by way of non-limiting example, each feature of an embodiment advantageously being able to be combined with any other feature of any other embodiment.

It should be noted that the figures are not to scale.

Figure 1:
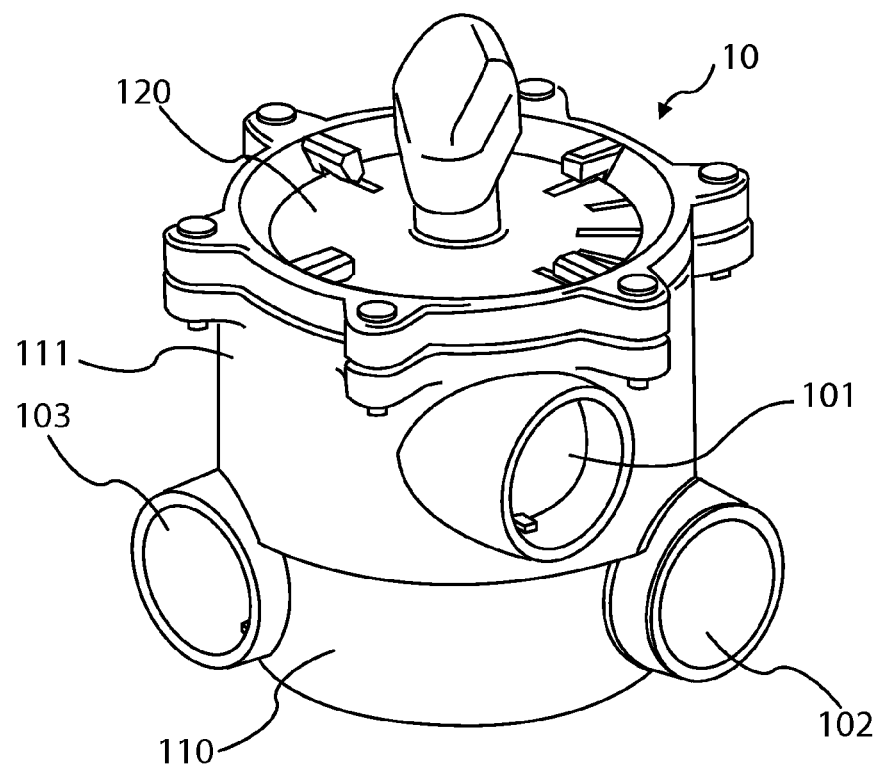
FIG. 1 shows schematically and in perspective view a particular embodiment of the valve according to the invention.
Figure 13:
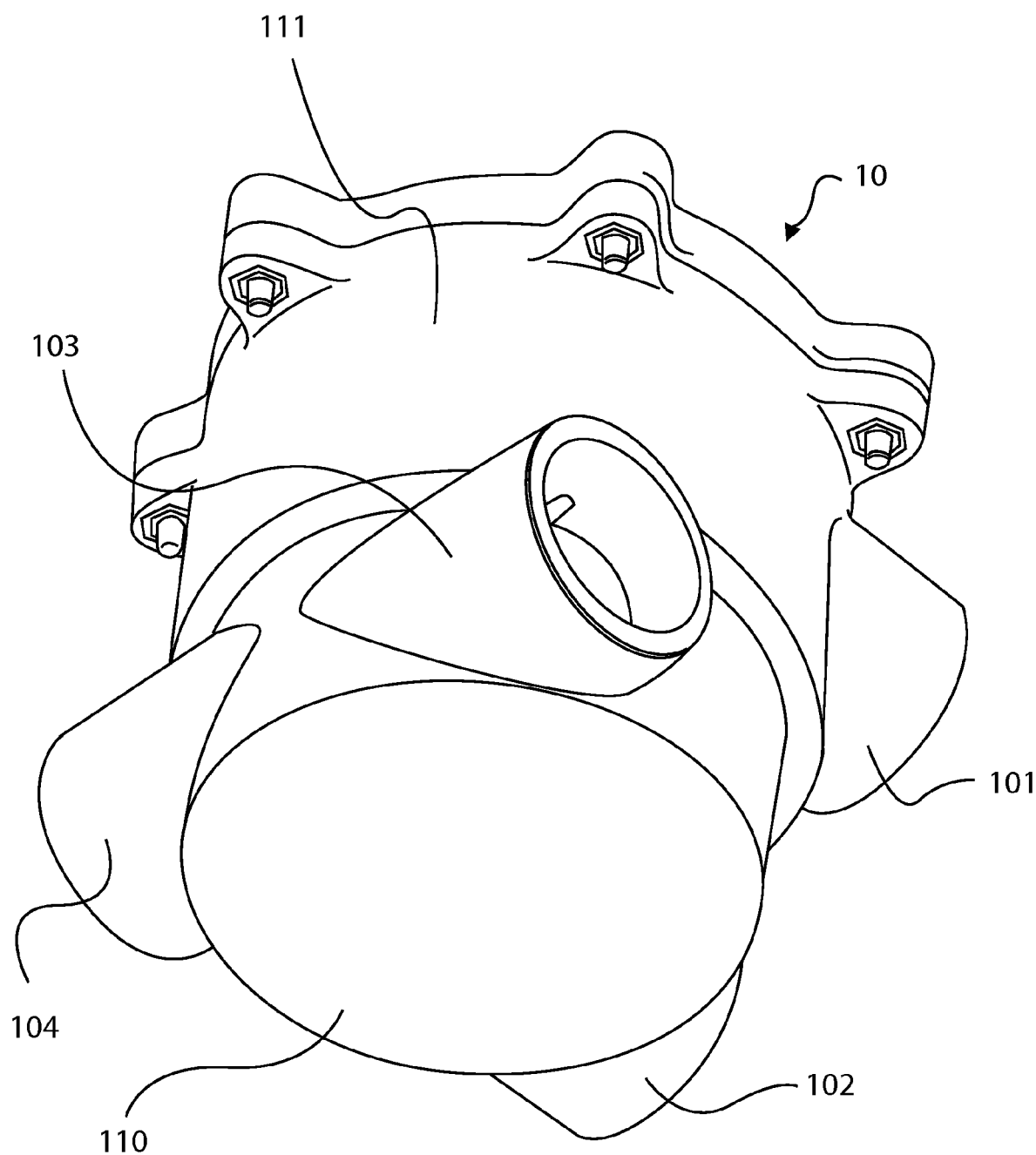
FIG. 13 shows schematically and in perspective view a particular embodiment of the valve according to the invention.

In FIGS. 1 and 13 a particular embodiment of a connecting valve 10 between a principal circuit and a circuit mounted in a bypass is seen. The valve 10 comprises a valve body. The valve body is in the form of two cylinders mounted one on top of the other. The first cylinder forms an upper part 111 and the second cylinder forms a lower part 110. The diameter of the upper part 111 is greater than that of the lower part 110 such that a circular shoulder is formed at the junction of the two cylinders.

The valve body is perforated by four tube connections 101, 102, 103 and 104 which are configured to be connected to flexible or rigid tubes capable of circulating a fluid.

In some embodiments, the valve body is formed from plastics materials, for example polyvinylchloride.

The first tube connection 103, the so-called "principal inlet", is arranged on the lower part 110 of the valve body. The first connection 103 is capable of being connected to means for collecting the water of the swimming pool (not shown). The means for collecting the water of the swimming pool are, for example, drain plugs or skimmers.

The second tube connection 104, the so-called "principal outlet", is arranged on the lower part 110 of the valve. The second tube connection 104 is capable of being connected to means for recirculating the water (not shown) into the swimming pool, for example nozzles.

The third tube connection 101, the so-called "bypass outlet", is arranged on the upper part 111 of the valve body. The third tube connection 101 is capable of being connected to a supply pipe of a bypass circuit, also called the secondary circuit.

The fourth tube connection 102, the so-called "bypass return", is arranged on the lower part 110 of the valve body. The fourth tube connection 102 is capable of being attached to a pipe for collecting water after circulation in the bypass circuit.

The valve 10 makes it possible to bypass all or part of the principal circuit flow to the bypass circuit. In some embodiments of the invention, the bypass circuit comprises swimming pool equipment of the heating means type, for example a heat pump. In some embodiments of the invention, the swimming pool equipment is equipment for treating water.

The lower part 110 of the valve body is subdivided into a plurality of compartments by a vertical wall formed in the valve body, the profile thereof being cross-shaped. Three compartments in the form of cylinder quarters are thus formed in the lower part of the valve body. Each compartment is open on its upper face, such that when a compartment is filled with liquid, this liquid may overflow into an adjacent compartment.

Moreover, each compartment is perforated on its external periphery by one of the tube connections, including the principal inlet 103, the principal outlet 104 and the bypass return 102.

The connecting valve 10 further comprises a control member 120 which is mounted so as to be mobile in rotation in the upper part 111 of the valve body. The control member 120 is of cylindrical shape and of smaller dimensions than the upper part 111 of the valve body.

The upper surface 121 of the control member 120 forms a disk. The lower surface of the control member 120 forms a quarter disk which will be called sealing member 122.

Advantageously the disk forming the upper face of the control member, which will also be called the selection disk, is in contact with the valve body so as to be visible by the user when handling the control member.

A flange 130 is mounted on the upper part 111 of the valve body and fixed in place by a plurality of screws 131. The flange 130 is mounted so as to block the movement in translation of the control member without otherwise concealing the disk forming the upper face of the control member. A seal ensuring a sealed connection is clamped between the flange 130 and the upper part 111 of the valve body.

The control member 120 further comprises a partition 125 mounted perpendicular to a diameter of the disks forming the upper and lower faces of the control member 120. The partition 125 separates the control member into two separate compartments. From the two compartments formed, one is closed on its upper face and partially open on its lower face, the lower remaining surface of the compartment being occupied by the sealing member 125. This compartment further comprises on its periphery at least two openings having dimensions close to the tube connection 101. The other compartment is open on its lower face and closed on the remainder of its surface.

The operation of the invention will be more clearly understood with regard to the figures shown hereinafter which illustrate different positions of the control member 120, permitting different configurations of the valve 10. At this stage, it is useful to specify that the solid black lines, shown passing through the valve in the drawings in FIG. 3, FIG. 4, FIG. 6, FIG. 7, FIG. 9 and FIG. 10, illustrate the circulation of a liquid in the valve.

Figure 11:
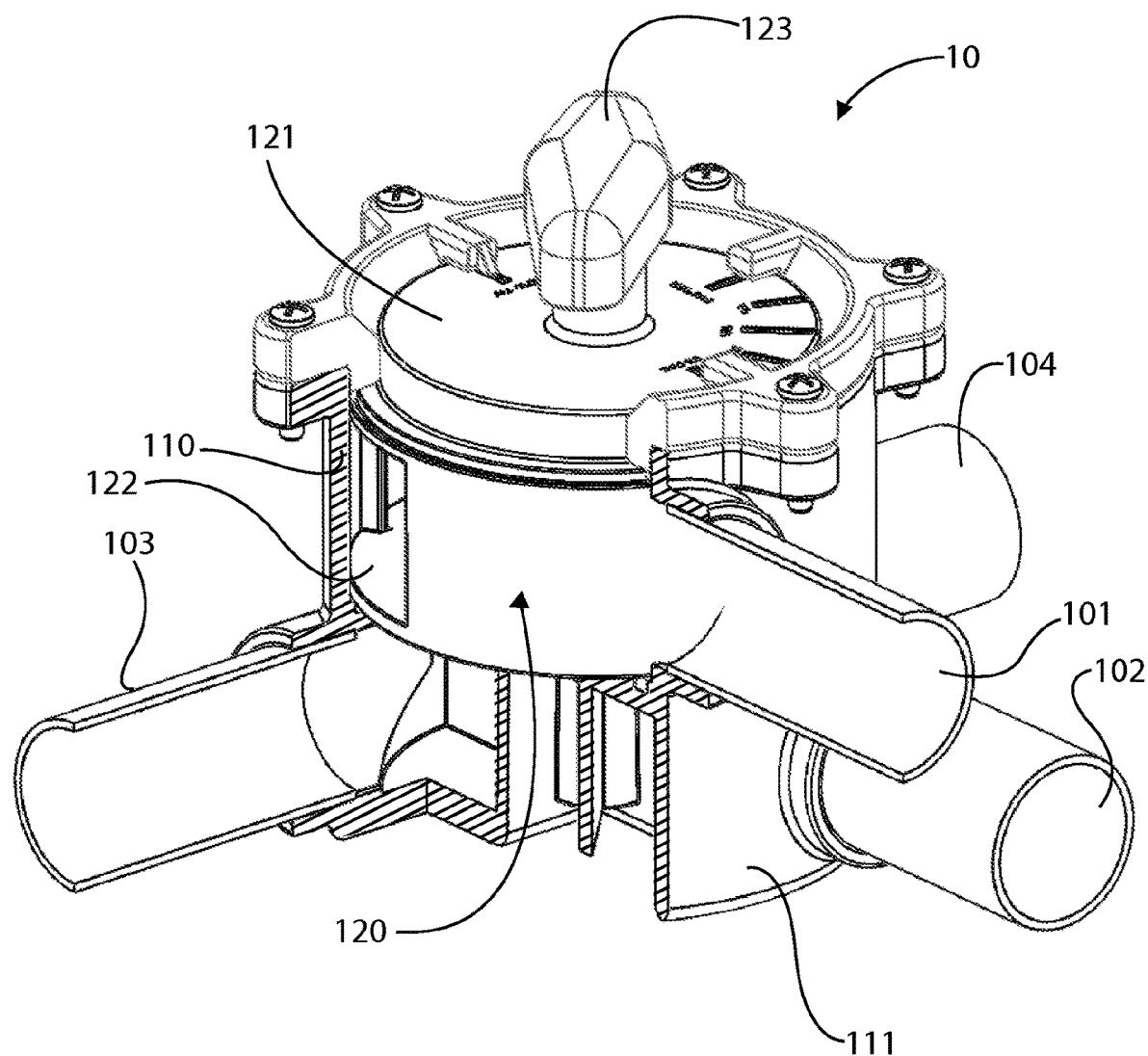
FIGS. 11 and 12 show schematically in partial section and in perspective view a particular embodiment of the valve according to the invention in its fourth configuration.
Figure 12:
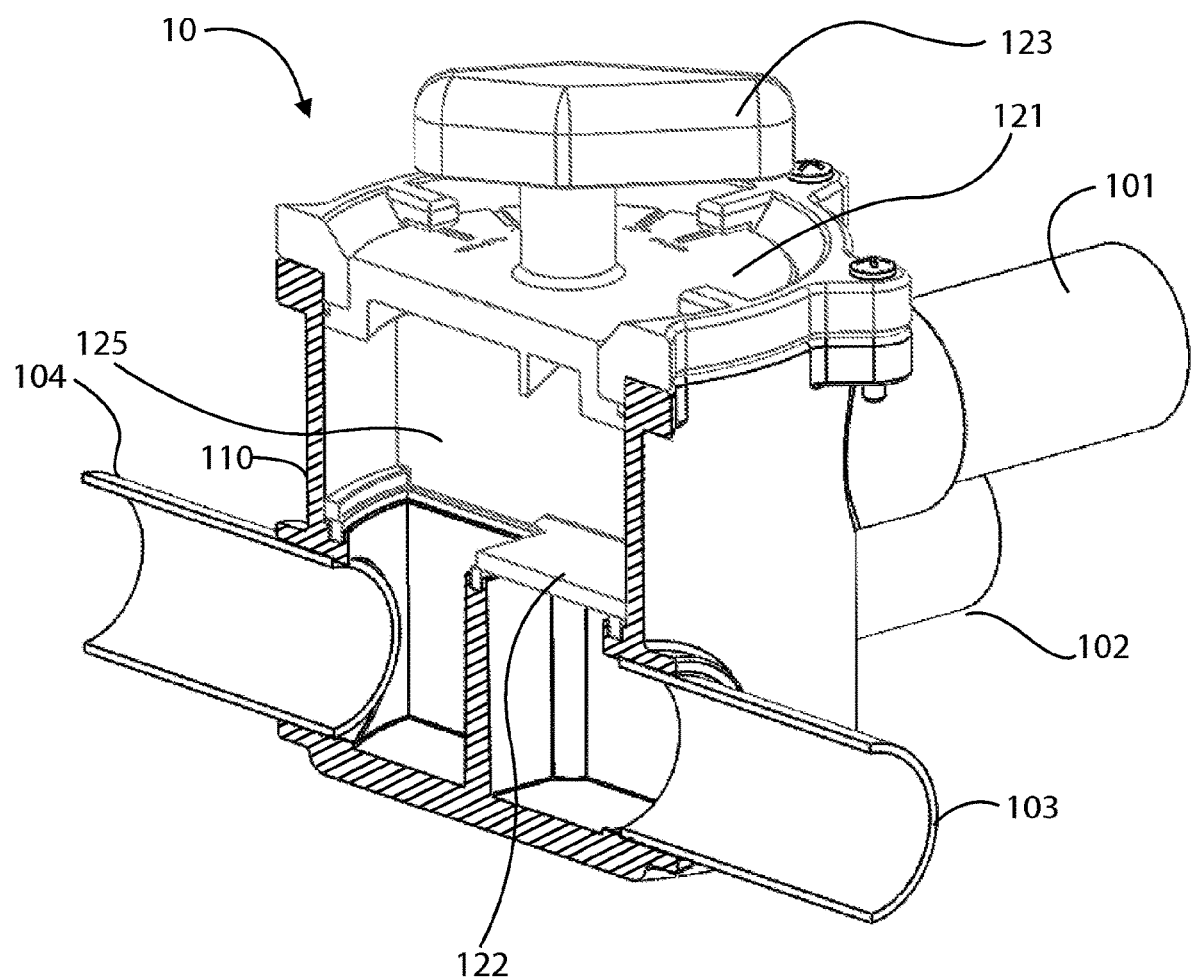

FIGS. 11 and 12 illustrate the valve 10 in its fourth configuration. In this configuration, each of the tube connections is isolated from the others.

In this fourth configuration the control member 120 is positioned so that the sealing member 122 completely covers the upper face of the compartment perforated by the principal inlet 103. Thus the liquid arriving in the valve 10 via the principal inlet is not able to circulate to the principal outlet or to the bypass outlet.

Figure 3:
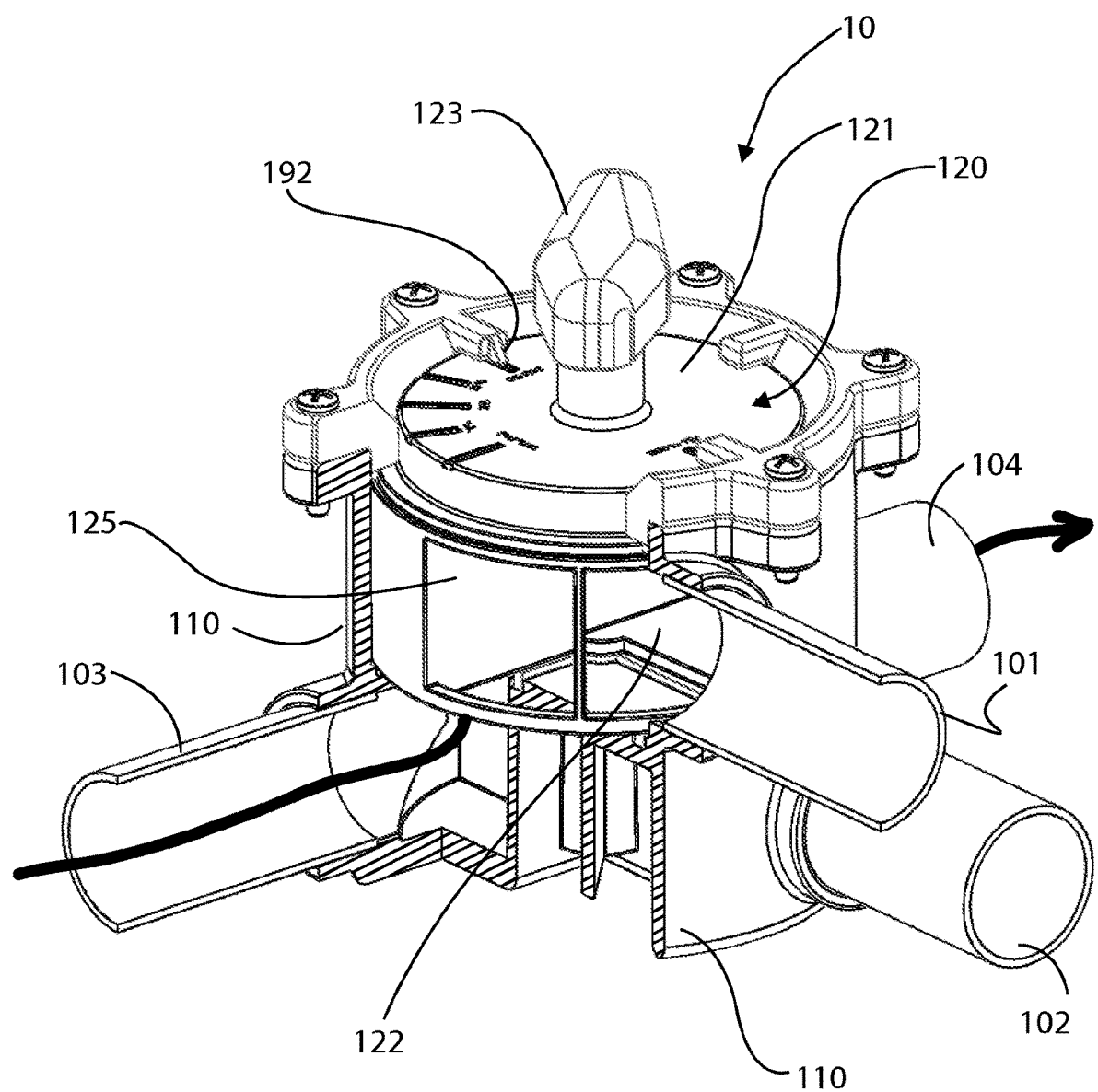
FIGS. 3 and 4 show schematically in partial section and in perspective view a particular embodiment of the valve according to the invention in its first configuration.
Figure 4:
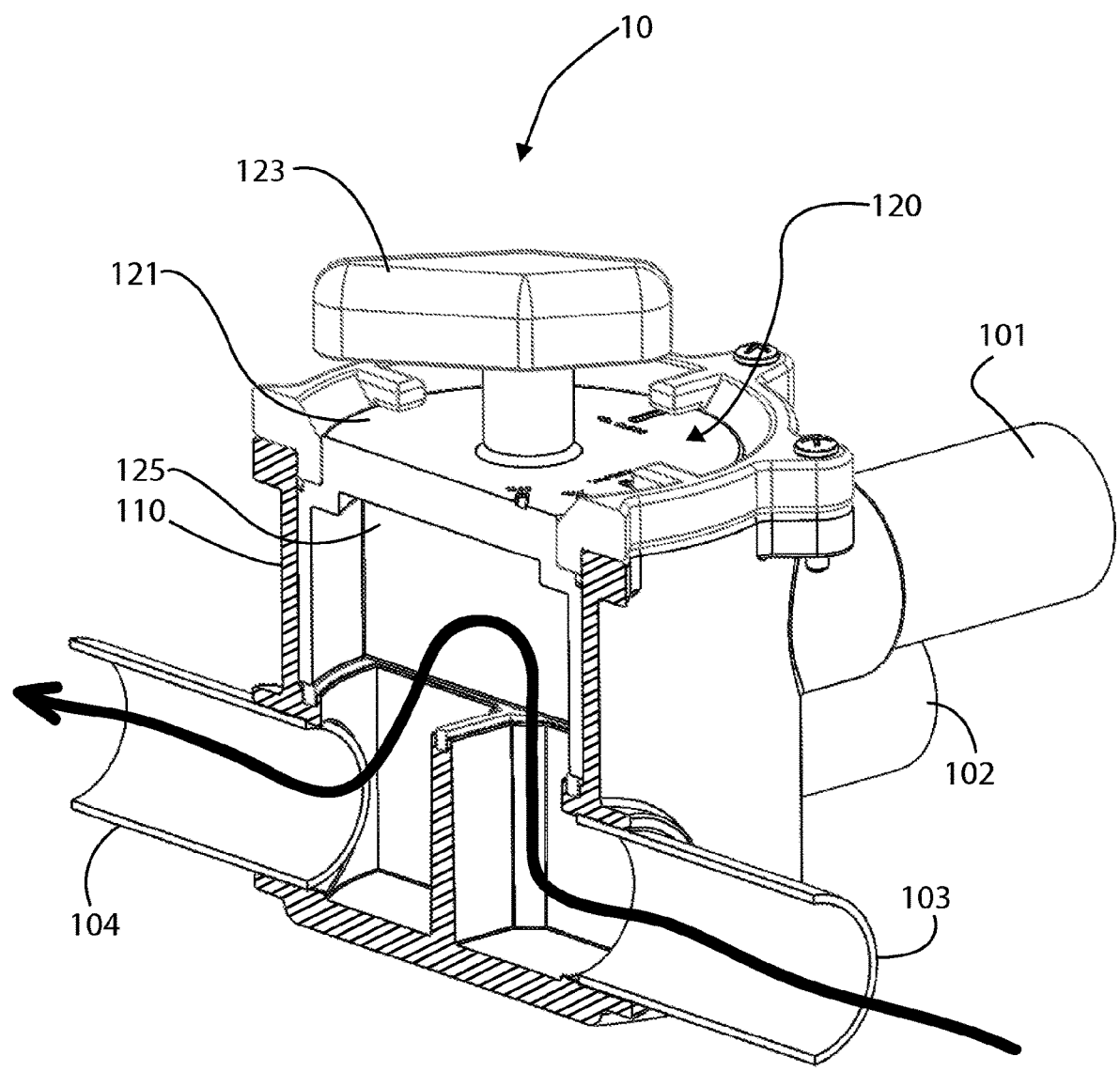

FIGS. 3 and 4 illustrate the valve 10 in its first configuration. The first configuration permits the flow of liquid from the principal inlet 103 to the principal outlet 104. In this configuration, the position of the control member guides 100% of the liquid flowing from the principal inlet to the principal outlet by the overflow of the liquid from the compartment perforated by the tube connection 103 to the compartment perforated by the tube connection 104. The partition 125 blocks the flow of the liquid to the other tube connections.

Figure 5:
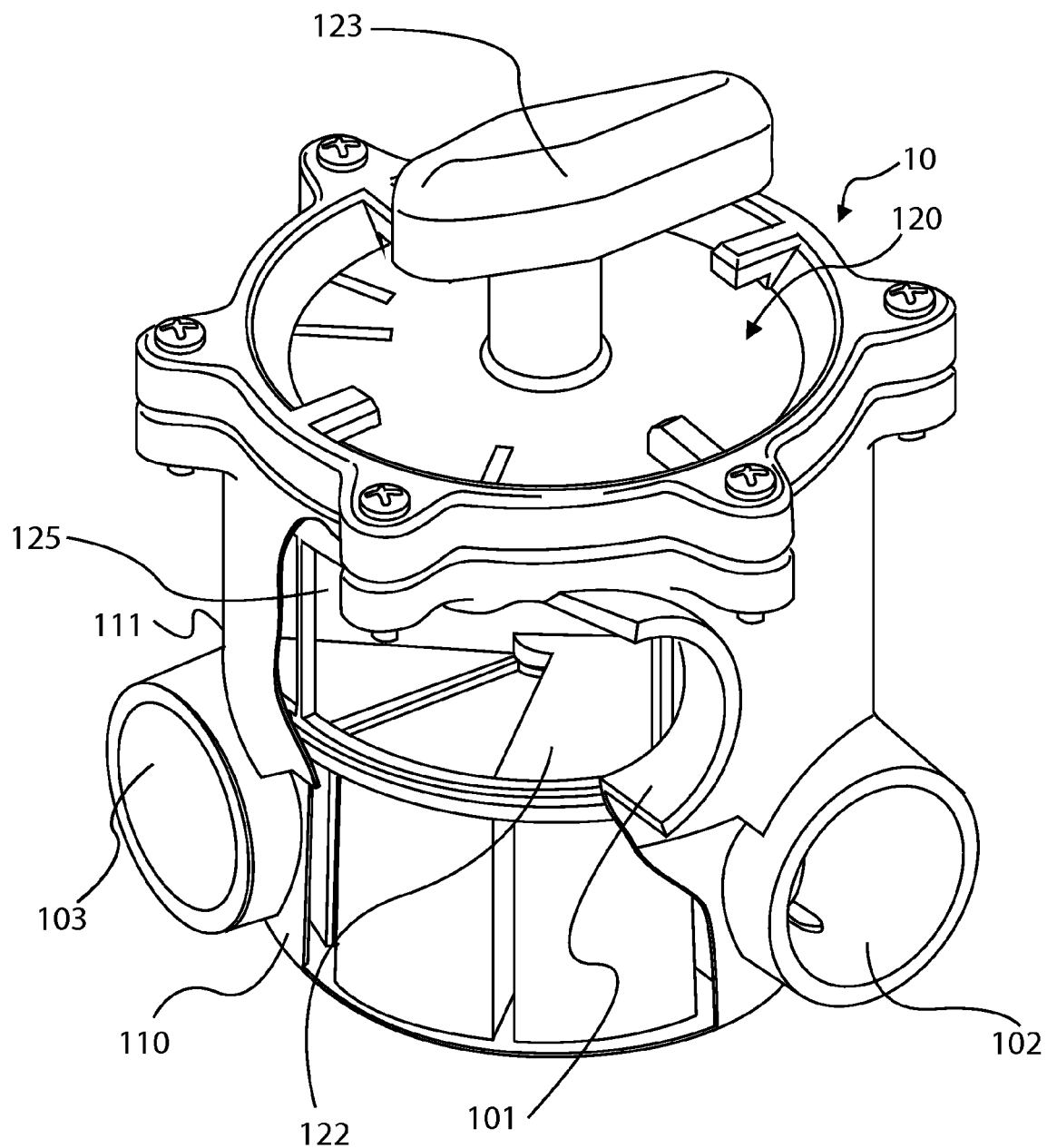
FIGS. 5, 6 and 7 show schematically in partial section and in perspective view a particular embodiment of the valve according to the invention in its third configuration.
Figure 6:
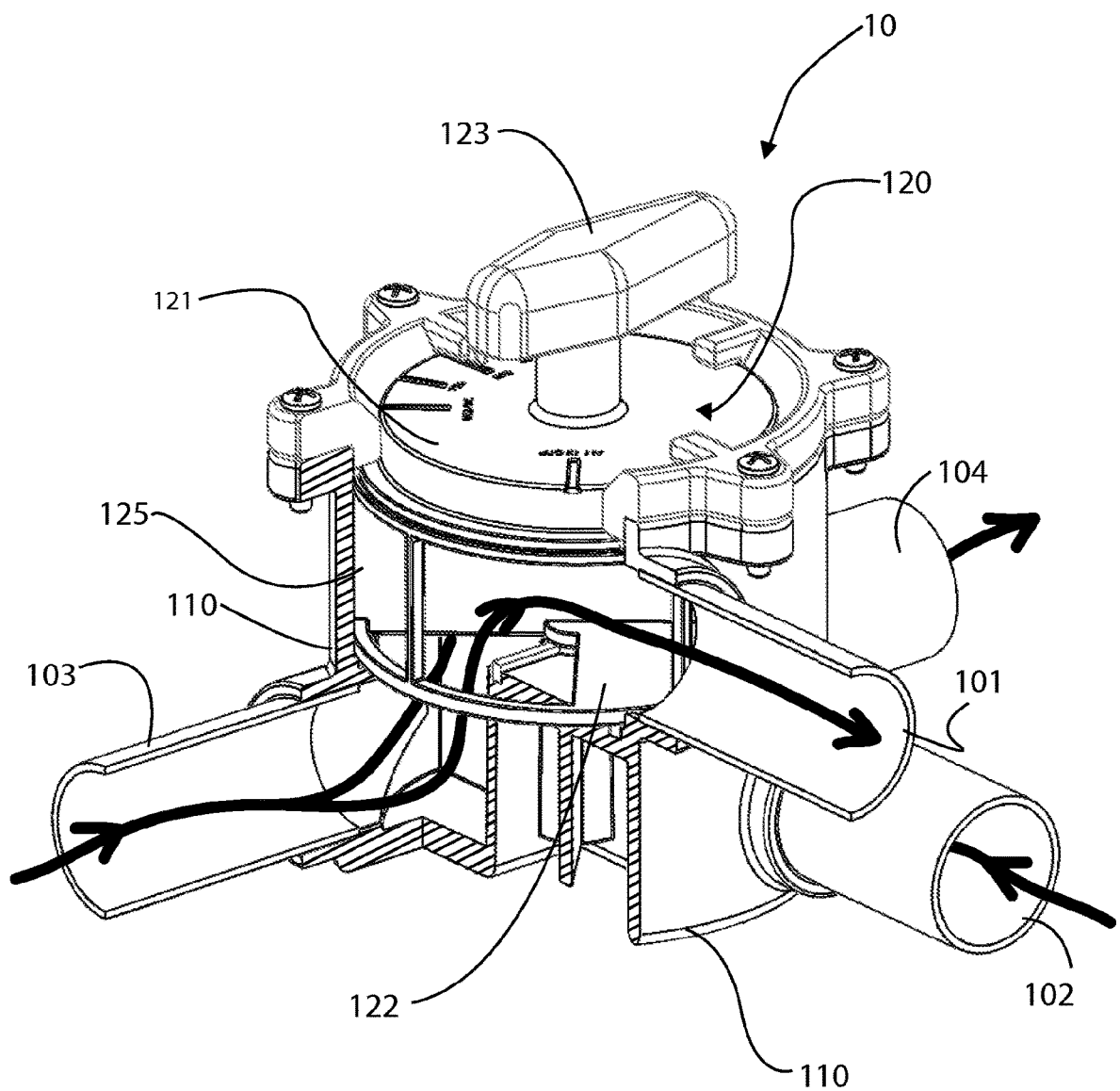
Figure 7:
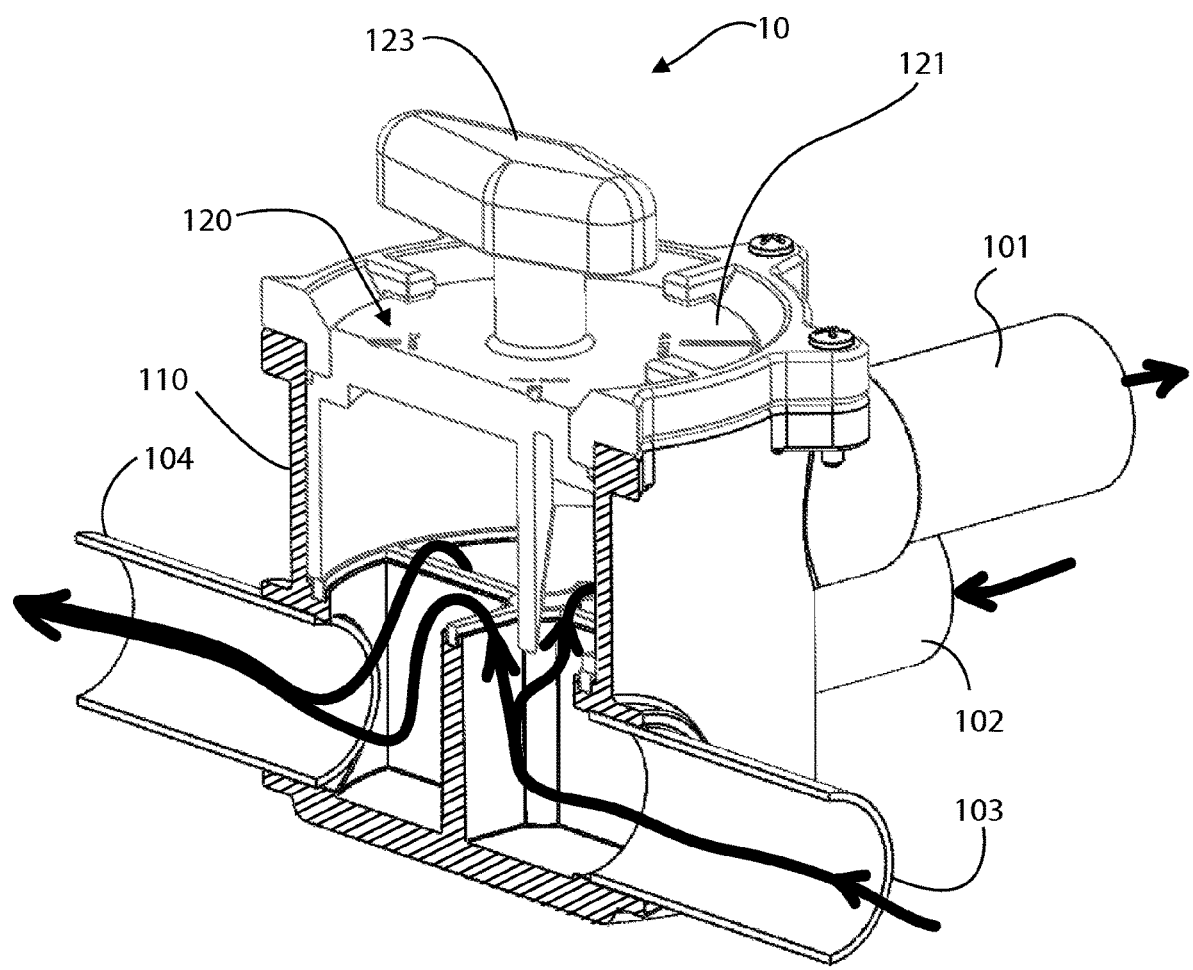

FIGS. 5, 6 and 7 illustrate the valve 10 in its third configuration. This configuration permits the flow of liquid from the principal inlet 103 both to the principal outlet 104 and to the bypass outlet 101. The control member 120 thus positioned, guides approximately 50% of the liquid flowing from the principal inlet 103 to the principal outlet 104 and approximately 50% of the liquid to the bypass outlet 101. The liquid bypassed to the bypass outlet 101 circulates in the bypass circuit before flowing to the bypass return 102. The liquid bypassed into the compartment perforated by the bypass return 102 overflows in turn by flowing over into the compartment perforated by the principal outlet 104.

It will be clearly understood with reference to the figures and the present description that the control member 120 may be handled so as to control the proportion of liquid fluid guided toward the bypass circuit, the remaining proportion of fluid being guided into the principal circuit. This variation may be carried out continuously or sequentially in a stepwise manner.

Figure 8:
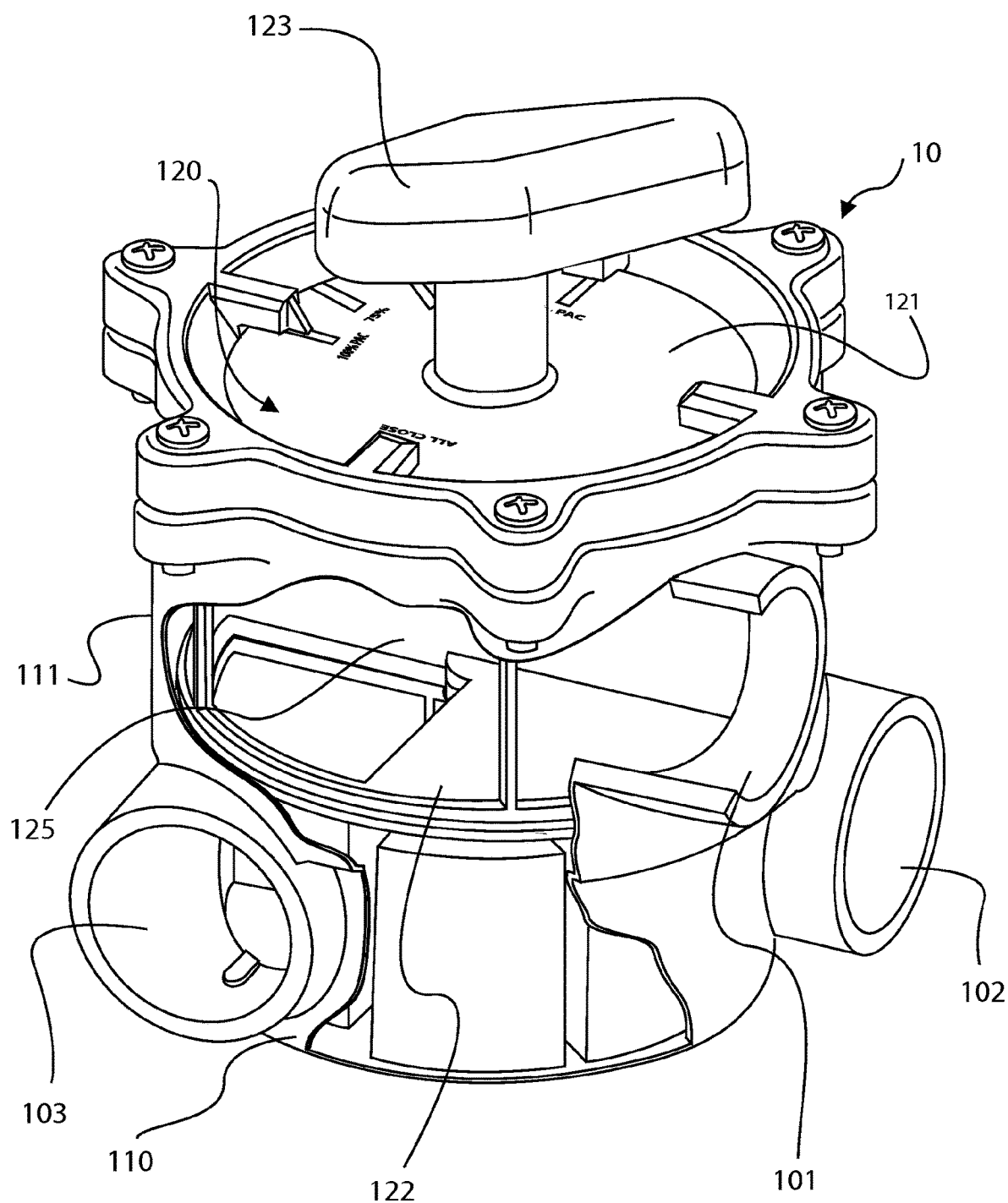
FIGS. 8, 9 and 10 show schematically in partial section and in perspective view a particular embodiment of the valve according to the invention in its second configuration.
Figure 9:
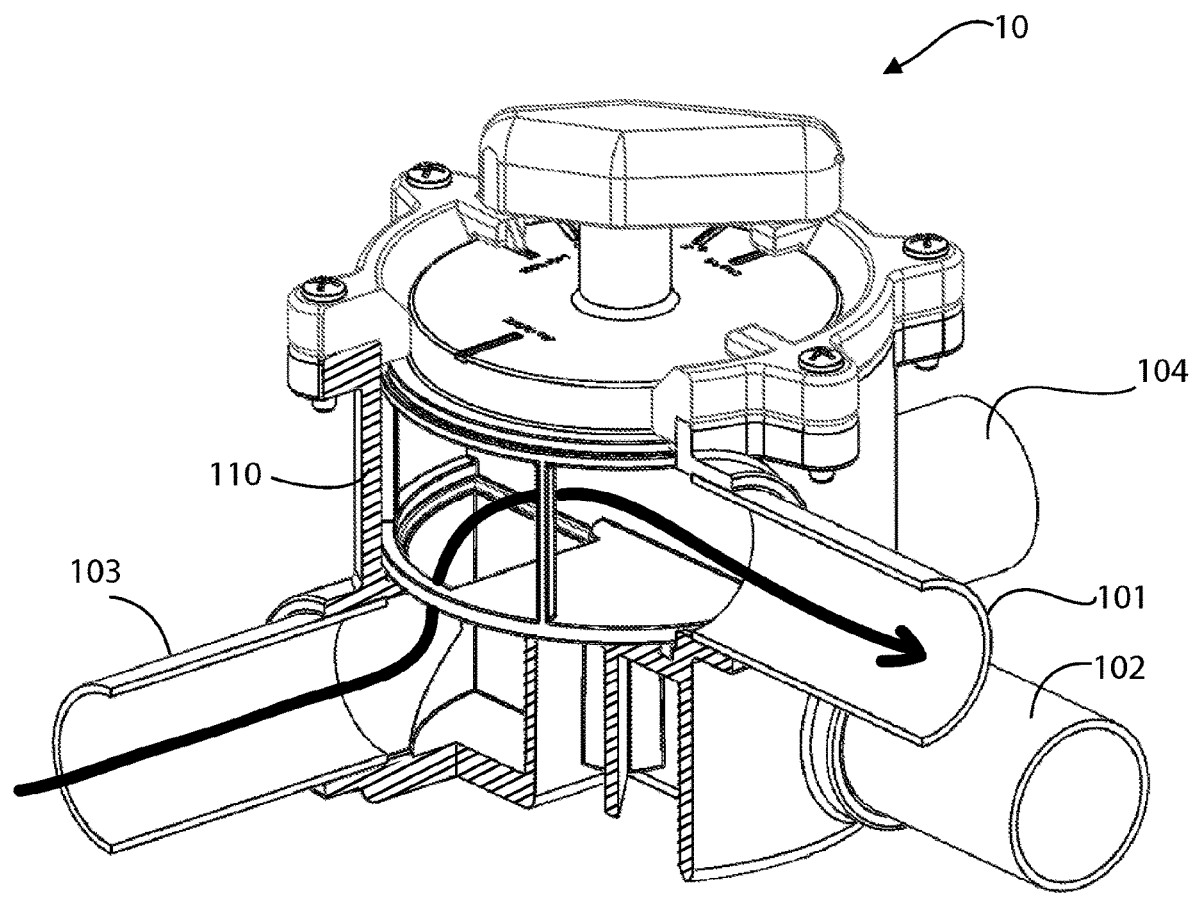
Figure 10:
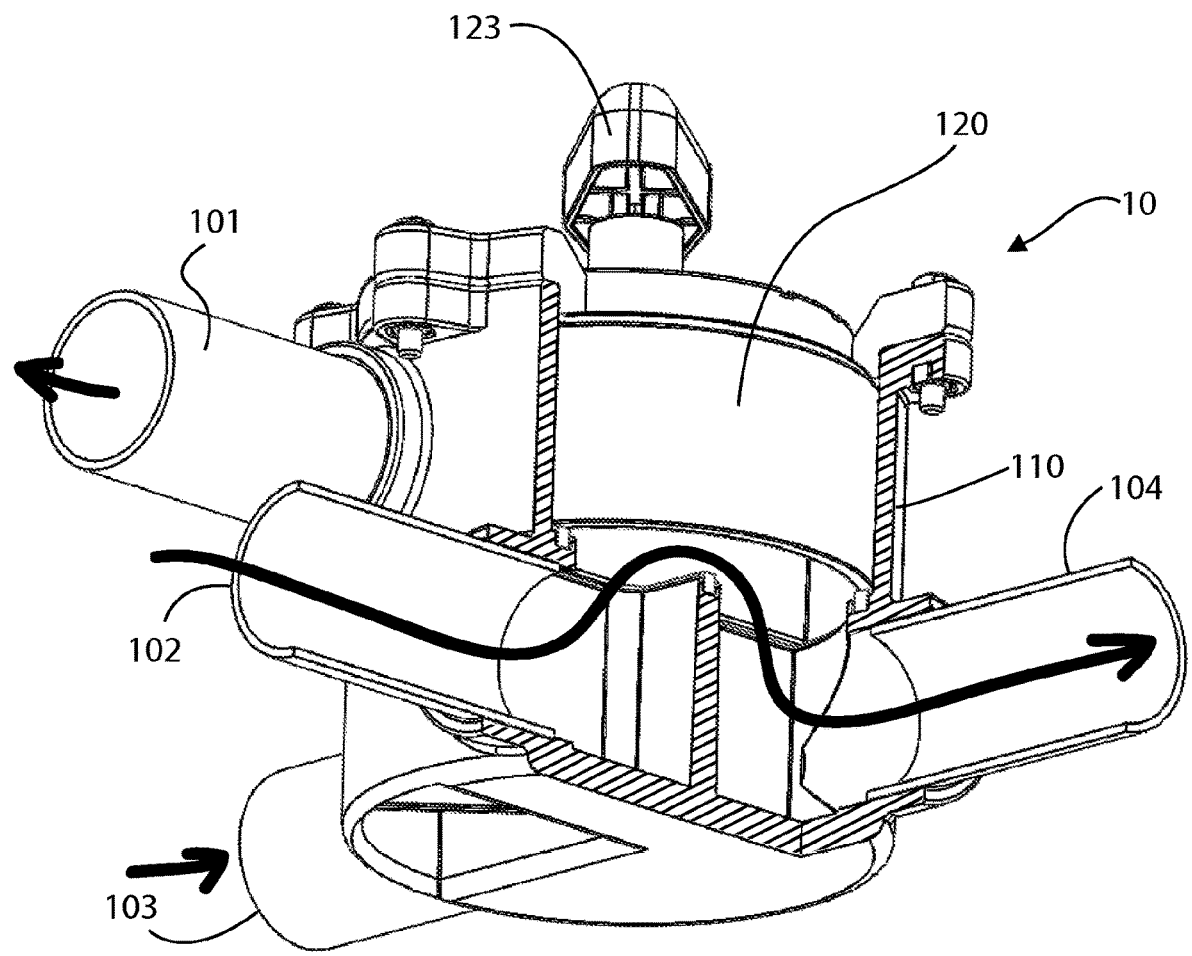

FIGS. 8, 9 and 10 illustrate the valve 10 in its second configuration. This configuration permits the flow of 100% of the liquid from the principal inlet 103 to the bypass outlet 101. The liquid which has overflowed into the compartment perforated by the principal inlet 103 flows over into the compartment formed in the control member 120 and then overflows into the bypass outlet 101. The liquid which has overflowed into the bypass outlet 101 circulates in the bypass circuit before flowing toward the bypass return 102. The liquid which has overflowed into the compartment perforated by the bypass return 102 overflows, in turn, by flowing over into the compartment perforated by the principal outlet 104.

Advantageously, the valve 10 comprises means for blocking (not shown) which are configured to resist the rotation of the control member 120 at predetermined positions. These blocking means may comprise, for example, projections which are positioned on the external peripheral surface of the control member and which are capable of cooperating with cavities on the internal periphery of the valve body. The implementation of the blocking means permits the creation of steps which will be felt by the user during the rotation of the control member 120.

The valve 10 comprises a gripping handle 123 which is fixed to the control member 120 and facilitates the rotation thereof by an operator.

In some embodiments, the valve 10 comprises at least one visual indicator 190 of the position of the control member 120. The visual indicator 190 on the upper face 121 of the control member 120 cooperates with a second fixed visual indicator 192 formed by a triangular projection in the flange 130. The alignment of the indicator borne by the flange with the indicator borne by the control member informs the user of the valve of the current position of the control member and thus of the configuration in which the valve is located.

Figure 2:
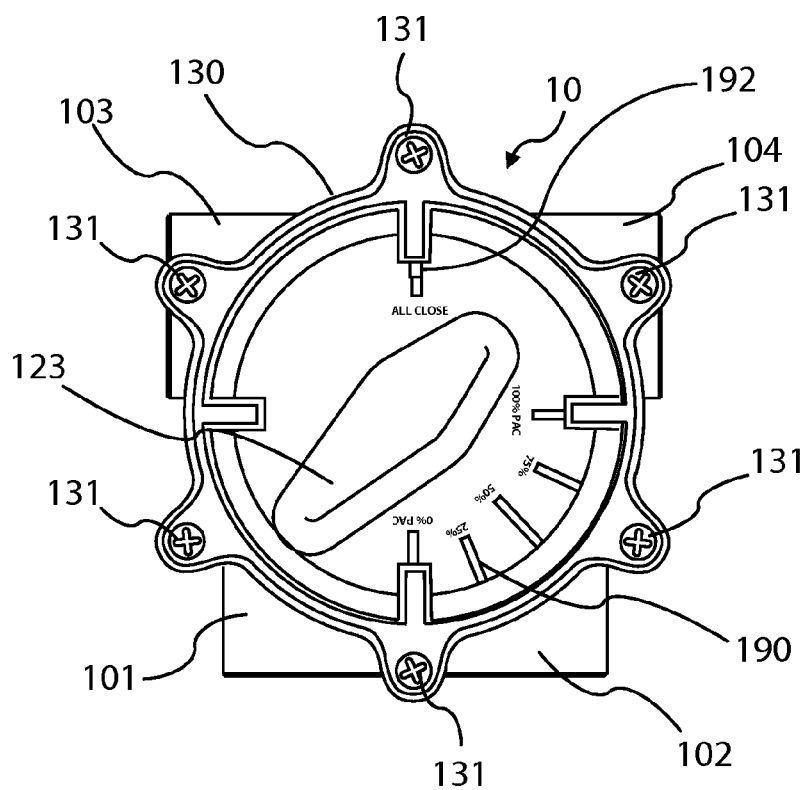
FIG. 2 shows schematically and in a view from above a particular embodiment of the valve according to the invention.

In one embodiment, illustrated in FIG. 2, the following visual indicators are present on the control member 120:

an indicator which indicates that the valve 10 is in the first configuration in which a first tube connection, the so-called "principal inlet", is placed in communication solely with a second tube connection, the so-called "principal outlet", an indicator which indicates that the valve 10 is in the second configuration in which the principal inlet is placed in communication with a third tube connection, the so-called "bypass outlet", and a fourth tube connection, the so-called "bypass return", is placed in communication with the principal outlet, a plurality of indicators which indicate that the valve 10 is in the third configuration in which the principal inlet is placed in communication at the same time with the principal outlet, each of these indicators specifying the percentage of the flow guided toward the bypass circuit, for example 25%, 50% and 75%, and an indicator which indicates that the valve 10 is in the fourth configuration in which each of the tube connections is isolated from the others.

In some embodiments, the valve 10 comprises a motorized means (not illustrated) providing the rotation of the control member.

In some embodiments, the valve 10 comprises at least one sensor (not illustrated) measuring physical data representative of a state of the fluid and a central unit controlling the motorized means as a function of the physical data measured by the sensor.

In some embodiments, the valve 10 comprises means for detecting the position of the control member and means for transmitting the position of the control member to a remote server.

In some embodiments, the valve 10 is configured to be controlled remotely by an operator by means of an intelligent portable terminal.

The invention claimed is:

1. A connecting valve through which fluid may flow, comprising:
   a. a valve body comprising a plurality of compartments and first, second, third, and fourth tube connections; and
   b. a control member comprising an opening configured to move relative to the plurality of compartments so as to permit selective creation of fluid communication configurations in which:
      i. in a first configuration, the first tube connection is placed in fluid communication solely with the second tube connection;
      ii. in a second configuration, the first tube connection is placed in fluid communication with the third tube connection and the fourth tube connection is placed in fluid communication with the second tube connection; and
      iii. in a third configuration, the first tube connection is placed in fluid communication with both the second and third tube connections and the fourth tube connection is placed in fluid communication with the second tube connection.

2. A connecting valve according to claim 1 in which the opening is configured to move relative to the plurality of compartments so as to permit selective creation of a fourth configuration in which no fluid communication exists between any of the first, second, third, and fourth tube connections.

3. A connecting valve according to claim 1 in which the third configuration enables a proportion of fluid flowing from the first tube connection to the third tube connection to be varied continuously or sequentially, with a remainder of the fluid flowing to the second tube connection.

4. A connecting valve according to claim 1 in which the control member is rotatable in relation to the body, an angular position of the control member controlling proportions of fluid communicated from the first tube connection to the second and third tube connections.

5. A connecting valve according to claim 1 in which a first compartment of the plurality of compartments is connected to the first tube connection, a second compartment of the plurality of compartments is connected to the second tube connection, a third compartment of the plurality of compartments is connected to the third tube connection, and the control member is configured to be positioned so as to overlap the second and third compartments to vary a proportion of fluid flowing to the third tube connection, with a remainder of the fluid flowing to the second tube connection.

6. A connecting valve according to claim 1 in which the control member further comprises a sealing member configured to cooperate with the valve body to block flow of fluid when the sealing member is positioned opposite the first tube connection.

7. A connecting valve according to claim 1 further comprising a gripping handle fixed to the control member.

8. A connecting valve according to claim 1 further comprising at least one visual indicator of position of the control member.

9. A connecting valve through which fluid of a swimming pool may flow, comprising:
  a. a valve body comprising a plurality of compartments and a principal inlet, a principal outlet, a bypass outlet, and a bypass return; and
  b. a control member comprising an opening configured to move relative to the plurality of compartments so as to permit selective creation of fluid communication configurations in which:
    i. in a first configuration, the principal inlet is placed in fluid communication with the principal outlet;
    ii. in a second configuration, the principal inlet is placed in fluid communication with the bypass outlet and the bypass return is placed in fluid communication with the principal outlet; and
    iii. in a third configuration, the principal inlet is placed in fluid communication with both the principal outlet and the bypass outlet and the bypass return is placed in fluid communication with the principal outlet.

10. A connecting valve according to claim 9 in which, in the first configuration, the principal inlet is placed in fluid communication solely with the principal outlet.

* * * * *